US009156992B2

(12) United States Patent
Prabhu et al.

(10) Patent No.: US 9,156,992 B2
(45) Date of Patent: Oct. 13, 2015

(54) PROCESS FOR THE PREPARATION OF CARBON BLACK PELLETS

(75) Inventors: Mayur Prabhu, Maharashtra (IN); Vijay Agarwal, Maharashtra (IN); Ranjan Ghosal, Maharashtra (IN); S. Rajamohamed, Maharashtra (IN)

(73) Assignees: Aditya Birla Science & Technology Company Limited, Mumbai (IN); Aditya Birla Nuvo Limited, Mumbai (IN)

( * ) Notice: Subject to any disclaimer, the term of this patent is extended or adjusted under 35 U.S.C. 154(b) by 59 days.

(21) Appl. No.: 13/576,251

(22) PCT Filed: Jan. 31, 2011

(86) PCT No.: PCT/IN2011/000063
§ 371 (c)(1),
(2), (4) Date: Jul. 31, 2012

(87) PCT Pub. No.: WO2011/095986
PCT Pub. Date: Aug. 11, 2011

(65) Prior Publication Data
US 2012/0292794 A1 Nov. 22, 2012

(30) Foreign Application Priority Data
Feb. 3, 2010 (IN) ............................ 273/MUM/2010

(51) Int. Cl.
*C09C 1/58* (2006.01)

(52) U.S. Cl.
CPC ........................................ *C09C 1/58* (2013.01)

(58) Field of Classification Search
None
See application file for complete search history.

(56) References Cited

U.S. PATENT DOCUMENTS

| 3,014,810 | A | | 12/1961 | Dybalski et al. | |
|---|---|---|---|---|---|
| 3,565,658 | A | * | 2/1971 | Frazier et al. | 106/476 |
| 3,645,765 | A | * | 2/1972 | Frazier et al. | 106/477 |
| 3,691,071 | A | | 9/1972 | Corrin et al. | |
| 3,776,750 | A | | 12/1973 | Mills | |
| 3,844,811 | A | * | 10/1974 | Brynko | 106/447 |
| 3,956,445 | A | | 5/1976 | Hunt | |
| 4,102,967 | A | | 7/1978 | Vanderveen et al. | |
| 4,264,552 | A | * | 4/1981 | McMahon et al. | 264/117 |
| 4,859,387 | A | * | 8/1989 | McGuffin | 264/117 |
| 5,871,706 | A | * | 2/1999 | Whitehouse | 423/449.2 |
| 6,231,624 | B1 | * | 5/2001 | Vogler et al. | 23/314 |
| 6,241,813 | B1 | * | 6/2001 | Baliello et al. | 106/493 |

FOREIGN PATENT DOCUMENTS

| CA | 2363724 A1 | 8/2001 |
|---|---|---|
| GB | 718771 A | 11/1954 |
| GB | 956039 A | 4/1964 |
| JP | 1-201369 A | 8/1989 |
| JP | 11-100524 A | 4/1999 |
| JP | 2956122 B2 | 10/1999 |

OTHER PUBLICATIONS

International Search Report (ISR) mailed on Aug. 11, 2011 by the International Searching Authority of the State Intellectual Property Office, the P.R. China, in the counterpart International Application No. PCT/IN2011/000063.

* cited by examiner

*Primary Examiner* — Mary F Theisen
(74) *Attorney, Agent, or Firm* — Ballard Spahr LLP

(57) ABSTRACT

The present disclosure envisages a process for pelletizing carbon black by mixing carbon black powder and water in a proportion in the range of 0.1:2 to 2:1 with a binding agent and a dispersing agent. The dispersing agent is an amine-based surfactant and is added in a proportion in the range of 0.005-0.1% of the total mixture. The mixture is pelletized in a pelletizer and subsequently the raw pellets are dried for 20-60 minutes at a temperature between 150-250° C., to obtain the carbon black pellets. The process of the present disclosure provides uniform distribution of water on the surface of the pellets giving a uniform pellet quality, reduced water consumption, energy savings and an increased production rate.

7 Claims, No Drawings

PROCESS FOR THE PREPARATION OF CARBON BLACK PELLETS

FIELD OF DISCLOSURE

The present disclosure relates to a process for pelletizing carbon black.

BACKGROUND

In industry, loose carbon black is commonly formed as carbon black pellets by a pelletization process, since carbon black in the pellet form provides an increased density and easy handling and transportation. Also, carbon black in the pellet form is easier to use in the various processing equipments. Therefore, most of the industrial applications involving carbon black demand pelletization. Conventionally, a pelletization process involves adding a solution of water and a binding agent to carbon black powder to obtain a mixture, the mixture is pelletized in a drum pelletizer or a pin pelletizer. Later, thermal processing is provided to dry the pellets obtained from the pelletizer so as to remove the moisture.

One major drawback of the conventional pelletization method is the improper distribution of water and binding agent in the mixture with carbon black. To overcome this drawback and meet the pellet quality requirements, excessive water is added. Later, during thermal processing, the water is removed by application of heat, typically in a rotary drum dryer. Excess water results in an increased load on the dryer and a resultant drop in the production output of the process. Also, the energy required for drying and the time taken in drying is increased due to the excess water. Therefore, the uniform distribution of water and the binding agent in the mixture with carbon black is crucial in the pelletization process. Further, due to improper distribution of the pelletization components, the quality of the carbon black pellets so produced is not uniform.

The use of dispersing agents has been studied in the past, so as to effect a more uniform dispersion of the carbon black in an end-use application, for example: in rubber or plastic. However, there is still felt a need to provide an improved pelletization process which ensures uniform distribution of water and the binding agent in the mixture with carbon black, so as to obtain carbon pellets having uniform quality.

Several attempts have been made to provide a pelletization process for carbon black that overcomes one or more of the drawbacks listed above. Some of the disclosures are listed in the prior art below:

U.S. Pat. No. 3,776,750 discloses a two-stage process for pelletizing carbon black. The first stage comprises forming a first mixture of carbon black and an oil-water emulsion and the second stage involves adding water to the first mixture to obtain a second mixture. The second mixture is then agitated to form carbon black pellets. The process as disclosed in U.S. Pat. No. 3,776,750 aims at providing soft pellets which can be disintegrated easily and dispersed in rubber.

U.S. Pat. No. 3,956,445 discloses an improved carbon black pelleting method which produces layered pellets having relatively high density. The method comprises the steps of combining an aqueous pelleting liquid and loose carbon black in a weight ratio of about ⅔ to 2, and agitating the resultant mixture in a pellet mill to form pellets. Additional carbon black is added in a series of increments and additional water is finally added. By controlling the relative amounts of carbon black, pelleting liquid, and the time of addition of incremental carbon black, the layered pellets are formed.

U.S. Pat. No. 4,102,967 discloses a method for pelleting carbon black to produce layered carbon black pellets having a hardened outer shell. The method comprises the steps of: introducing an aqueous pelleting liquid and loose carbon black in a weight ratio of about 2:3 to about 2:1, agitating the mixture in a pellet mill to form pellets, introducing additional carbon black into the mill, and finally introducing an additional liquid containing ammonium lignin sulfonate or hydrocarbon oil into the mill to obtain layered pellets. The layered pellets so obtained reduce dispersion related problems and dusting problems while handling.

The present disclosure aims at providing an improved process for pelletizing carbon black, the process primarily aims at providing a uniform distribution of water and the binding agent on the surface of the carbon black pellets, thereby, providing uniform dispersion of carbon black in end-use applications. Also, the present disclosure aims at reducing the water consumption and conserving energy while increasing the productivity and enhancing the pellet quality.

OBJECTS OF THE DISCLOSURE

An object of the present disclosure is to provide a process for pelletizing carbon black.

Another object of the present disclosure is to provide a process for pelletizing carbon black which gives uniform distribution of water on the surface of the pellets.

Yet another object of the present disclosure is to provide a process for pelletizing carbon black which gives energy savings.

Still, another object of the present disclosure is to provide a process for pelletizing carbon black which gives uniform pellet quality.

One more object of the present disclosure is to provide a process for pelletizing that reduces the amount of water required in pelletization of powdered carbon black.

Still one more object of the present disclosure is to provide a process for pelletizing carbon black which reduces the time taken for drying wet pellets.

Yet one more object of the present disclosure is to provide a process for pelletizing carbon black which gives an increased production rate.

SUMMARY OF THE DISCLOSURE

In accordance with the present disclosure, is disclosed a process for pelletizing carbon black, said process comprising the following steps:
  obtaining a homogenous mixture of carbon black powder, water, a binding agent, and a dispersing agent; wherein, the ratio of carbon black and water is in the range of 0.1:2.0 to 2:1 and said dispersing agent is an amine-based surfactant comprising an amine and a polyether, said dispersing agent being in the range of 0.005-0.1% of said mixture;
  pelletizing said homogenous mixture in a pelletizer to obtain raw carbon black pellets; and
  drying said raw carbon black pellets for a time period of 20-60 minutes at a temperature between 150-250° C., to obtain carbon black pellets.

Typically, in accordance with the present disclosure, the process for pelletizing carbon black includes the step of selecting said amine from the group of amines consisting of primary, secondary, tertiary, diamines, triamines, aromatic, alicyclic, and cycloaliphatic.

Preferably, in accordance with the present disclosure, the process for pelletizing carbon black includes the step of selecting said polyether to comprise at least one compound selected from the group of compounds consisting of ethylene oxide and propylene oxide.

Additionally, in accordance with the present disclosure, the process for pelletizing carbon black includes the step of selecting said polyether to comprise at least one group selected from the set of groups consisting of aliphatic, olefinic, cyclic and aromatic, said group being at least one type selected from the types consisting of linear and branched.

Typically, in accordance with the present disclosure, the process for pelletizing carbon black includes the step of selecting said dispersing agent having amine to polyether ratio in the range of 0.1:10 to 10:0.1.

Preferably, in accordance with the present disclosure, the process for pelletizing carbon black includes the step of selecting said polyether having ethylene oxide to propylene oxide ratio not lesser than 1.

In accordance with the present disclosure, the process for pelletizing carbon black includes the step of adding said binding agent in the range of 5-15% of said mixture.

DETAILED DESCRIPTION OF THE DISCLOSURE

The present disclosure envisages a process for pelletizing carbon black to provide carbon black pellets having uniform quality, wherein, a dispersing agent, typically an amine-based surfactant comprising an amine and a polyether, is added simultaneously with water and a binding agent, in a proportion in the range of 0.005-0.1% of the total mixture. The addition of the dispersing agent during pelletization results in uniform distribution of water on the surface of the carbon black pellets, which, in turn, gives the benefits of uniform pellet quality, reduced water consumption, energy savings and increased production rate.

The process for pelletizing carbon black, in accordance with the present disclosure, primarily comprises the step of: obtaining a homogenous mixture of carbon black powder, water, a binding agent, and a dispersing agent; wherein, the ratio of carbon black and water in the homogenous mixture is in the range of 0.1:2.0 to 2:1; the dispersing agent, which is typically an amine-based surfactant comprising an amine and a polymeric chain typically polyether, in the range of 0.005-0.1% of the homogenous mixture; the binding agent is in the range of 5-15% of the homogenous mixture. The homogenous mixture is then pelletized in a pelletizer to obtain raw or wet carbon black pellets. The addition of the dispersing agent during the pelletization process helps in reducing the amount of water required to be added to form the homogenous mixture. Therefore, the moisture content of the raw carbon black pellets so formed is lesser than as compared to when the dispersing agent is not added. The raw carbon black pellets are dried for a time period of 20-60 minutes at a temperature between 150-250° C., to obtain carbon black pellets. Due to the reduced moisture content in the raw pellets, the time required for drying the pellets is less, thus, saving up to 2-10% energy. The moisture content of the pellets can be intermittently checked by withdrawing pellet samples from selective zones in the drier and measuring the moisture content.

The amine-based surfactant used as the dispersing agent mainly comprises the amine and the polyether chain; wherein, the amine, which is the anchoring group, is selected from the group of amines consisting of primary, secondary, tertiary, diamines, triamines, aromatic, alicyclic, and cycloaliphatic; and the polyether chain comprises at least one compound selected from ethylene oxide and propylene oxide. The surfactant of present disclosure may include one or more organic oxides, which are essentially polyethers, in the polymeric chain. Additionally, the polyether chain comprises at least one group selected from an aliphatic, an olefinic, a cyclic and an aromatic group; wherein, the group is linear and/or branched, and is attached to the ether linkage along with the ethylene oxide and/or propylene oxide. The amine to the polyether ratio in the dispersing agent is in the range of 0.1:10 to 10:0.1, wherein, an amine to polyether ratio of 0.5:2.0 is preferred. To obtain optimal process conditions, the dispersing agent is added in the range of 0.005-0.1% of the total pelletization mixture. Also, preferably, the polyether in accordance with the present disclosure comprises ethylene oxide and propylene oxide in a ratio equal to or less than 1.

In a preferred embodiment of the present disclosure, the carbon black powder and water is mixed in a ratio of 1:1, and the raw wet carbon black pellets are dried at a temperature in the range of 180-220° C. for 30-45 minutes. As the time taken for drying the wet pellets is reduced by 3-10% in comparison with the conventional pelletization methods, the pellet production rate is significantly increased and the energy consumption is substantially decreased. Also, uniform distribution of water and the binding agent in the mixture with carbon black, due to incorporation of the dispersing agent, results in uniform drying, and thus gives pellets of uniform quality and properties. The pelleting process of present disclosure may be continuous or batch, where, in both cases the pellet production rate is increased in terms of unit time, which is decreased for each pelletizing cycle thereby giving increased number of cycles. Further, the reduction in the amount of water added to the carbon black powder aids in providing a uniform size distribution of the wet carbon black pellets. The process of the present disclosure is applicable to all varieties of carbon blacks, and may be conveniently used with the conventional pelleting apparatus.

TEST RESULTS

The disclosure will now be described with respect to the following examples which do not limit the scope and ambit of the disclosure in anyway and only exemplify the disclosure.

EXAMPLE 1

A first mixture (A) of carbon black powder and water in the ratio 1:1 was pelletized without any dispersing agent; and a second mixture (B) of carbon black powder and water containing 0.01% of the dispersing agent in the mixture, was pelletized similarly. The quantity of water used in the second mixture (B) was 5% less than the first mixture (A). The wet pellets so formed from the pelletizer were dried for 30-45 minutes at a temperature in the range of 150-250° C., where, all the pellets were dried under substantially identical conditions. The carbon black pellets so obtained were analyzed for final pellet properties and various process parameters, the results are illustrated in TABLE 1.

TABLE 1

Comparative analysis of final pellet properties and process parameters for pellets obtained from the first mixture (A) and the second mixture (B).

| PROPERTIES | UNITS | CARBON BLACK PELLETS FROM (A) | CARBON BLACK PELLETS FROM (B) |
|---|---|---|---|
| Pelletization Process Parameters | | | |
| Wet Mixer Load | KW | 60 | 50 |
| Water Flow Rate | LPM | 98 | 95 |
| Energy Consumption (during drying cycle) | $Nm^3/hr$ | 9700 | 9330 |
| Carbon Black Pellet Properties | | | |
| Fines | % | 4.02 | 3.6 |
| Pellet Hardness | gm force | 19.6 | 19.5 |

It is observed from TABLE 1 that the carbon black pellets obtained by the process of the present disclosure have enhanced pellet quality. Further, it is observed that the water consumption is reduced. Still further, energy is conserved during the mixing and drying cycle.

EXAMPLE 2

Carbon black pellets were pelletized in a pelletizer by applying the conventional mixing process, and using the process of the present disclosure, wherein the carbon black powder was combined with a solution of water, polyether amine surfactant and a binding agent in the ratio 1:0.0001:0.1, respectively. The resultant carbon black pellets were required to be dried only for 35 minutes to obtain carbon black pellets of desired quality.

TECHNICAL ADVANTAGES

A process for pelletizing carbon black comprising the steps of: mixing carbon black powder and water in a proportion in the range of 0.1:2 to 2:1, along with a binding agent in a proportion in the range of 5-15% of the mixture and a dispersing agent in a proportion in the range of 0.005-0.1% of the mixture, pelletizing the mixture, and drying the raw pellets for 20-60 minutes at a temperature between 150-250° C., to obtain the carbon black pellets; the process as described in the present disclosure has several technical advantages including but not limited to the realization of:

- the process for pelletizing carbon black involves adding the dispersing agent, which is an amine-based surfactant comprising an amine and a polyether, with water and the binding agent, to obtain a uniform distribution of water on the surface of the pellets, thus, ensuring uniform pellet quality;
- the process for pelletizing carbon black, by giving a uniform distribution of water on the surface of the pellet, also helps in reducing the quantity of water required to be added during the pelletization process, thereby, not only reducing the water consumption but also giving up to 2-10% energy savings during the drying cycles; and
- the process for pelletizing carbon black saves time during the drying cycles and therefore gives an increased production rate.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary. Wherever a range of values is specified, a value up to 10% below and above the lowest and highest numerical value respectively, of the specified range, is included in the scope of the disclosure.

In view of the wide variety of embodiments to which the principles of the present disclosure can be applied, it should be understood that the illustrated embodiments are exemplary only. While considerable emphasis has been placed herein on the particular features of this disclosure, it will be appreciated that various modifications can be made, and that many changes can be made in the preferred embodiments without departing from the principle of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for pelletizing carbon black, said process comprising the following steps:
   obtaining a homogenous mixture of carbon black powder, water, a binding agent, and a dispersing agent; wherein, the ratio of carbon black and water is in the range of 0.1:2.0 to 2:1 and said dispersing agent is an amine-based surfactant comprising an amine and a polyether, said dispersing agent being in the range of 0.005-0.1% of said mixture; pelletizing said homogenous mixture in a pelletizer to obtain raw carbon black pellets; and drying said raw carbon black pellets for a time period of 20-60 minutes at a temperature between 150-250.degree. C., to obtain carbon black pellets.

2. The process for pelletizing carbon black as claimed in claim 1, which includes the step of selecting said amine from the group of amines consisting of primary, secondary, tertiary, diamines, triamines, aromatic, alicyclic, and cycloaliphatic.

3. The process for pelletizing carbon black as claimed in claim 1, which includes the step of selecting said polyether to comprise at least one compound selected from the group of compounds consisting of ethylene oxide and propylene oxide.

4. The process for pelletizing carbon black as claimed in claim 1, which includes the step of selecting said polyether to comprise at least one group selected from the set of groups consisting of aliphatic, olefinic, cyclic and aromatic, said group being at least one type selected from the types consisting of linear and branched.

5. The process for pelletizing carbon black as claimed in claim 1, which includes the step of selecting said dispersing agent having amine to polyether ratio in the range of 0.1:10 to 10:0.1.

6. The process for pelletizing carbon black as claimed in claim 3, which includes the step of selecting said polyether having ethylene oxide to propylene oxide ratio not lesser than 1.

7. The process for pelletizing carbon black as claimed in claim 1, which includes the step of adding said binding agent in the range of 5-15% of said mixture.

* * * * *